3,174,220
SOLDERING FLUXES
Hobart N. Durham, Jr., 340 Park Ave., Manhasset, N.Y.
No Drawing. Filed Feb. 21, 1963, Ser. No. 260,304
4 Claims. (Cl. 29—495)

The present invention relates to novel and improved, basic soldering fluxes, especially for the soldering of copper and its alloys at temperatures up to about 670° F.

The present invention has for an object the provision of a novel and improved soldering flux which is especially adapted for use in the soldering of copper and its alloys, is useful even on relatively dirty and corroded materials, and which is unusually free of any corrosive effect on the materials to be soldered. A further object is the provision of a novel and improved, basic water-soluble soldering flux, which has no substantial corrosive effect during its use, which leaves no water-insoluble residue, and which can be sufficiently removed by washing or rinsing in water that no subsequent corrosion occurs attributable to the flux. Still another object is the provision of an improved, novel soldering flux which combines to a high degree unusually effective cleaning of the metal surfaces with almost complete lack of corrosion of the metal, thus enabling even heavily oxidized or greasy surfaces to be soldered without pre-cleaning, substantial corrosion or elaborate procedures to remove the flux residues. The invention further provides a novel and improved method of making such a flux, as well as a novel and improved method of soldering using the flux of the present invention.

Heretofore, many fluxes have been used including a resinous or fatty base, and have presented serious problems in removing the flux from the soldered work-piece. Such removal, as has been possible, has been a relatively expensive operation, often leaves a current conducting path on an insulating member adjacent the conductor to be soldered, and also has often left a corrosive residue on the conductor member, which residue has proved to be removable only by elaborate cleaning techniques.

Other prior fluxes have provided a relatively non-corrosive fluxing activity on clean copper surfaces, but have required a previous cleaning operation if the surface of the copper work piece were oxidized. Acidic fluxes have been able to provide good fluxing activity with considerable attendant corrosion, which continued in the event that the work-piece was not thoroughly cleaned by elaborate cleaning procedures after the fluxing and soldering operations.

In order to provide a proper fluxing action, prior fluxes have often been highly acidic and have included substantial quantities of halogen-containing, oxidizing compounds, and the presence of the halogen material in the resinous or fatty base seems to have caused retention of a substantial amount of corrosive and conductive material which has been deleterious, and has often been the cause of eventual failure of the circuit members which had been soldered using such fluxes.

Other fluxes of the prior art of the water-soluble type have either provided a weak and unsatisfactory fluxing action, or have contained corrosive material which either attacked the metal to be soldered or remained on the metal, as insoluble residues, in sufficient quantity so as to cause eventual corrosion and eventual circuit or mechanical failure.

In my prior application, Serial No. 167,418, filed January 19, 1962, I have disclosed relatively non-corrosive, water-soluble, acidic fluxes for the soft-soldering of pieces of copper and its alloys, which fluxes and their residues are almost completely removed by simply washing the soldered pieces in pure water. In spite of their effectiveness for the soldering of copper and its alloys with soft solders, these fluxes are often relatively unsuited for soldering with higher melting solders at temperatures ranging above about 500° F.

The fluxes of the present invention thus have a wider range of application than those of my said prior application and may be used for soft soldering of copper, silver, iron, tin and other metals, as well as for alloys of those metals, and may be used at relatively low temperatures, as well as at the higher temperatures required by certain solders, even to temperatures as high as 670° F.

The basic fluxes of the present invention have even less corrosive effect than most prior fluxes; are reducing media, rather than oxidizing media; may be applied to the parts to be soldered hours prior to the soldering operation, without deleterious effect, thereby even improving the cleaning action of the flux on the parts to be soldered. The present fluxes have an unusually high degree of flow on the parts to be soldered and spread readily over the parts to be soldered. As the flux is applied, the surfaces are immediately cleaned at room temperatures with the preferred forms of the invention, and with other forms are rapidly cleaned as the parts are heated to soldering temperature.

Among the solders which are especially adapted for use with the fluxes of the present invention are the soft solders composed of tin and lead, in the respective proportions by weight of 50%/50%, 60%/40%, 33%/67%, and higher melting solders such as 95% tin 5% lead, melting at about 440° F.

According to the present invention, a flux is prepared by reacting hydrazine (or hydrazine hydrate) and urea in aqueous solution, and in the substantial absence of other reactive materials and impurities. Among the impurities especially to be avoided are the halogens, chlorine, bromine, iodine, and fluorine, and other acid forming radicals, such as the sulfates, phosphates, strong organic acid salts, and substantial quantities of alkaline materials, such as ammonium hydroxide. Thus, it is preferable to compound the fluxes using distilled or even de-ionized water, and relatively pure hydrazine (or hydrazine hydrate) and urea.

The order of mixing the hydrazine, urea and water is relatively unimportant, but I prefer to dissolve the urea in deionized water and afterwards add the hydrazine (or hydrazine hydrate) thereto in the required quantity However, the urea may be added to an aqueous solution of hydrazine or separate aqueous solutions of hydrazine and urea may be mixed in the proper ratios. In any case where anhydrous hydrazine is employed, it is immediately converted to the hydrate on mixing with water or the urea solution.

*Example 1.*

An excellent and preferred form of flux for the soldering of copper and copper alloy parts, such as conductors and heat sinks to be exposed to relatively high temperatures (below the softening point of the solder used) comprises equi-molar parts of hydrazine (anhydrous or hydrazine hydrate) and urea, and a quantity of deionized or relatively pure water. The concentration of the ingredients other than water is preferably from 10% by weight of the other ingredients, up to saturation of the water solvent. Optimum results are achieved when the total weight of the hydrazine and urea comprises about 36% of the total water solution.

Such a solution may be prepared by dissolving 150 grams of urea in 410 grams of deionized or relatively pure water, and to this solution is added, with mixing, 80 grams of commercial anhydrous hydrazine or 125 grams of commercial hydrazine hydrate. The small amount of impurity, principally aniline, which occurs in commercial anhydrous hydrazine is relatively non-deleterious, and as used herein the term anhydrous hydrazine includes the currently available commercial anhydrous hydrazine with its usual impurities.

On mixing, some reaction takes place between the ingredients, apparently resulting in the formation of a substantial quantity of semicarbazide, and the reaction does not go to completion. There is thus left a substantial portion of the hydrazine and urea in their basic, unreacted forms in the finished flux.

The concentrated flux thus prepared may be diluted with two parts by weight deionized, or substantially pure water to form a basic flux which has approximately 12% of non-aqueous components.

In use, the areas to be soldered are coated with a small amount of the flux, after which they are heated and soldered in the usual manner, using either soft solder, or the higher melting solders such as 95% tin-5% lead, or other suitable solder. When the soldering has been completed, the soldered parts are preferably washed in relatively pure, distilled or deionized water, which removes the flux and flux residues substantially completely.

While an equi-molar mixture of hydrazine or hydrazine hydrate and urea in a water solution containing about 36% by weight of non-aqueous components is preferred, more concentrated and more dilute solutions are also useful.

Dilute solutions are useful on relatively clean work pieces, while with greasy or heavily oxidized work pieces more concentrated solutions are found to be more useful.

Especially with the preferred embodiment and with more dilute solutions, it is often desirable and more effective to apply the flux to the parts to be soldered a considerable time prior to the actual heating and soldering operation. This greatly facilitates production, and due to the lack of corrosion there is no need to shorten the period the flux remains on the parts to be soldered. Thus, the flux may be applied, allowed to remain for an hour or several houurs, after which the soldering operation may take place. Thereafter, the part is quenched in water or rinsed in running hot or cold water, and all traces of flux are thereby removed from the parts.

In actual use, such a basic, reducing flux first acts to clean the surface of even relatively dirty copper or copper alloy parts at room temperature, which then discolor as the temperature of the parts is increased somewhat. At about 350° F. the copper parts again become bright, and remain bright and clean even after heating to about 670° F. As the flux cleans the surfaces to be soldered and as the flux decomposes at elevated temperatures, some slight amount of residue appears on the copper surface, but such residues are easily removed by washing in water, after the soldering operation has been completed, so that no corrosive residue is left, and there has been produced no green or blue residue, characteristic of copper corrosion, and which is generally observed when using the fluxes which contain halides, or even strong acidic components such as formic acid ions or large excesses of other acid ions.

Where soldered joints are to be made between copper-copper alloy parts, silver-copper, iron-iron, copper-iron, tin coated copper wire to copper terminals, silver-tin, silver-silver and other combinations of like metals, the same procedure may be followed, using the appropriate solder which is most suitable for the work to be done.

Other specific fluxes, according to the present invention may be made according to the weight formulations shown by the examples of the following table:

| Formula | Hydrazine, grams | Urea, g. | Water, g. | Wt. percent of hydrazine and urea in solution | Mole ratio of hydrazine to urea |
|---|---|---|---|---|---|
| A-10 | 20 | 150 | 300 | 36.2 | 1/4 |
| A-11 | 20 | 150 | 940 | 15.3 | 1/4 |
| A-13 | 20 | 150 | 1,410 | 10.7 | 1/4 |
| A-15 | 20 | 150 | 2,350 | 6.7 | 1/4 |
| B-10 | 40 | 150 | 240 | 44.2 | 1/2 |
| B-11 | 40 | 150 | 330 | 36.6 | 1/2 |
| B-13 | 40 | 150 | 850 | 18.3 | 1/2 |
| B-14 | 40 | 150 | 1,890 | 9.2 | 1/2 |
| B-16 | 40 | 150 | 2,930 | 6.2 | 1/2 |
| C-10 | 80 | 150 | 260 | 47.0 | 1/1 |
| C-11 | 80 | 150 | 410 | 36.0 | 1/1 |
| C-12 | 80 | 150 | 1,030 | 18.2 | 1/1 |
| C-13 | 80 | 150 | 1,660 | 12.2 | 1/1 |
| C-14 | 80 | 150 | 2,290 | 9.1 | 1/1 |
| C-16 | 80 | 150 | 3,550 | 6.1 | 1/1 |
| C-18 | 80 | 150 | 5,440 | 3.8 | 1/1 |
| C-19 | 80 | 150 | 320 | 41.8 | 1/1 |
| D-10 | 160 | 150 | 540 | 36.5 | 2/1 |
| D-11 | 160 | 150 | 1,390 | 18.2 | 2/1 |
| D-12 | 160 | 150 | 2,240 | 12.2 | 2/1 |
| E-10 | 240 | 150 | 680 | 36.4 | 3/1 |
| E-11 | 240 | 150 | 1,750 | 18.2 | 3/1 |
| E-13 | 240 | 150 | 3,890 | 9.1 | 3/1 |

Where hydrazine hydrate is used in place of anhydrous hydrazine, there may be used 31.3 grams, 62.5 g., 125 g., 250 g. or 375 g. in place of the 20 grams, 40 g., 80 g., 160 g. or 240 g., respectively, in the above formulae.

As illustrative of the substantially non-corrosive character of the fluxes of the present invention, tests with the flux of Formula No. C–14 show that immersion of sheet copper in that flux for a period of 66 hours at 23° C. produced a loss of copper of less than 0.1 mg. per square foot of copper surface immersed in the flux. Thus, it is substantially as non-corrosive as an alcoholic solution of white rosin, which requires careful pre-cleaning of the copper work piece for it to be effective as a soldering flux, and then requires cleaning with organic solvents for removal of flux residues after the soldering operation.

Formular C–11 in the above table is the preferred embodiment of Example 1. In its action, it is substantially the same as the action of Formulae C–10, C–12, C–13, C–14 and C–16, except that with the more dilute solutions, the ambient temperature fluxing action is less vigorous and rapid and may be deficient unless a sufficient quantity of the flux is allowed to act on the parts to be fluxed.

While equimolar mixtures of hydrazine and urea in water solution are preferred, a slight excess of hydrazine (or hydrazine hydrate) or of urea may be used with good results.

The fluxes of the series A, B and D above leave residues after soldering which are more slowly dissolved in water than those of the preferred C series fluxes which are readily soluble, even in cold water and may be removed by simply rinsing the parts in cold or hot water. The residues left by the A, B, D, and E series, prior to rinsing, are more noticeable than those of the C series.

While concentrations of equimolar parts of hydrazine and urea from 6% to 47% in water solution are preferred, especially from 12% to 42%, more concentrated and more dilute solutions are useful, the more concentrated solutions being less economical but producing less splattering. Splattering can also be avoided with less concentrated solutions by allowing some or all of the water to evaporate between the fluxing and soldering operations. Also, while concentrations of 36% by weight or less are generally preferred, even more concentrated solutions, up to saturated solutions may be used, and, of course may be diluted for use. The equimolar solution of about 36% concentration in water is preferred as the optimum, although solutions formed from one-half to two moles of hydrazine hydrate to each mole of urea also yield excellent results with almost no corrosion.

The invention in its broader aspects is not limited to the specific steps, processes and compositions shown and described but departures may be made therefrom within the scope of the accompanying claims without departing from the principles of the invention and without sacrificing its chief advantages.

What is claimed is:

1. In the process of soldering metals, in combination therewith the step of applying to the metal a flux consisting essentially of a water solution containing the reaction product in water solution of from one-fourth to three moles of hydrazine hydrate with one mole of urea, said solution containing from 3.8% to 47% by weight of dissolved material calculated as hydrazine and urea.

2. The method of claim 1 in which there is from one-half to two moles of hydrazine hydrate for each mole of urea.

3. The method of claim 1 in which there is one mole of hydrazine hydrate for each mole of urea, and the solution contains about 36% by weight of dissolved material calculated as hydrazine and urea.

4. The method of claim 3 in which the solution is substantially free of acid-forming radicals.

References Cited by the Examiner
UNITED STATES PATENTS 2,612,459   9/52   Willard et al. _____ 148—23

OTHER REFERENCES

Curtius et al.: Journal für praktische Chemie, volume 52 (1895), pages 455, 456.

DAVID L. RECK, *Primary Examiner*.